United States Patent
Isaacson

(10) Patent No.: US 10,402,902 B1
(45) Date of Patent: Sep. 3, 2019

(54) FINANCIAL EXCHANGE SYSTEM AND METHOD FOR PROCESSING RETAIL PRICE IMPROVEMENT ORDERS

(71) Applicant: Christopher Andrew Isaacson, Lenexa, KS (US)

(72) Inventor: Christopher Andrew Isaacson, Lenexa, KS (US)

(73) Assignee: Cboe Exchange, Inc., Chicago, IL (US)

( * ) Notice: Subject to any disclaimer, the term of this patent is extended or adjusted under 35 U.S.C. 154(b) by 54 days.

(21) Appl. No.: 14/217,131

(22) Filed: Mar. 17, 2014

Related U.S. Application Data

(60) Provisional application No. 61/793,877, filed on Mar. 15, 2013.

(51) Int. Cl.
*G06Q 40/04* (2012.01)

(52) U.S. Cl.
CPC .................................. *G06Q 40/04* (2013.01)

(58) Field of Classification Search
CPC ....................................................... G06Q 40/04
USPC ............................................................. 705/37
See application file for complete search history.

(56) References Cited

U.S. PATENT DOCUMENTS

| | | | | |
|---|---|---|---|---|
| 7,925,566 B1* | 4/2011 | Naratil | .................. | G06Q 40/06 705/36 R |
| 8,832,211 B1* | 9/2014 | Lebedev | ................ | G06Q 40/04 709/206 |
| 2002/0046152 A1* | 4/2002 | Kinney | .................. | G06Q 40/00 705/37 |
| 2006/0031157 A1* | 2/2006 | Gianakouros | .......... | G06Q 20/10 705/37 |
| 2007/0005485 A1* | 1/2007 | Tumen | ................. | G06Q 20/042 705/37 |

* cited by examiner

*Primary Examiner* — Robert R Niquette
*Assistant Examiner* — Liz P Nguyen
(74) *Attorney, Agent, or Firm* — Polsinelli PC

(57) ABSTRACT

An exchange order fulfillment method includes receiving, by at least one processor, a plurality of orders for trading an underlying security, at least one of the orders comprising a retail price improvement (RPI) order having an interest value that is more aggressive than one of a protected NBB and a protected NBO of the underlying security. The method further includes fulfilling, by the at least one processor, the orders based upon an aggressiveness of a respective interest value for each of the plurality of orders relative to the one of the protected NBB and the protected NBO of the underlying security.

40 Claims, 8 Drawing Sheets

RPI BOOK TABLE

| ORDER NO | ENTRY TIME | BUY SHARES | SELL SHARES | ORDER TYPE | OFFSET | FLOOR/ CEILING |
|---|---|---|---|---|---|---|
| 1 | 9:00 | 100 |  | RPI | .002 | 10.025 |
| 2 | 9:25 |  | 200 | RPI | .003 | 10.026 |
| 3 | 9:27 | 200 |  | RPI | .015 | 10.024 |

FIG. 1D

FINANCIAL EXCHANGE SYSTEM AND METHOD FOR PROCESSING RETAIL PRICE IMPROVEMENT ORDERS

CROSS-REFERENCE TO RELATED APPLICATIONS

This application claims the benefit of priority to U.S. Provisional Application No. 61/793,877, filed Mar. 15, 2013, entitled "Financial Exchange System and Method for Processing Retail Price Improvement Orders," the entire contents of which are hereby incorporated by reference. This application also is related to U.S. Provisional Application No. 61/657,019, filed Jun. 7, 2012, entitled "Financial Exchange Auction Systems and Methods" and U.S. Non-Provisional application Ser. No. 13/910,787, filed Jun. 6, 2013, entitled "Financial Exchange Auction Systems and Methods," the entire contents of which are hereby incorporated by reference.

FEDERALLY SPONSORED RESEARCH OR DEVELOPMENT

Not Applicable.

COMPACT DISK APPENDIX

Not Applicable.

BACKGROUND

A financial exchange is a market, physical or electronic, in which shares, options, derivatives, futures, and other units of financial instruments are bought and sold. Financial instruments, for example, include equities, securities, stocks, options, bonds, commodities, indexes, exchange-traded funds, and other instruments.

A financial exchange matches bids to buy a particular financial instrument with offers to sell that particular financial instrument and tracks the price and volume at which a trade for the financial instrument can be executed. The introduction of electronic trading systems into such exchanges has enabled investors to place orders for financial instruments over a computer network and receive the status of orders in near real time. These trading systems also report prices at which financial instruments are quoted, bought, and sold to reporting entities that consolidate and disseminate trading information for various financial instruments.

Brokers represent clients in buying or selling financial products through a particular exchange, as well as in obtaining market information from the exchanges for clients regarding market activity. A transaction may be completed when one or more buy and sell orders can be matched with respect to price.

One advantage of such trading systems is that marketable orders generally can be executed immediately against available contra-side interests. An order is marketable when it is priced equal to or more aggressively than the contra side interest. For example, a buy order for a financial instrument is marketable when it is priced equal to or more aggressively than the current best offer for the financial instrument, and a sell order for a financial instrument is marketable when it is priced equal to or more aggressively than the current best bid for the financial instrument. In this context, more aggressive means higher for a bid to buy or lower for an offer to sell.

Lower levels of liquidity lead to greater bid-ask spreads, (e.g., spreads in prices between bids and offers) larger discrepancies between net asset value and the value of the underlying securities, and a decreased ability to trade profitably. It is preferable to reduce the difference in prices between the best bid to buy and the best offer to sell. Such a tighter market is better for market participants.

Various market centers (e.g., including exchanges, alternative trading systems, and crossing networks) offer investors the opportunity to participate in a scheduled auction process throughout the trading day. In an auction process, the price of a particular financial instrument offering is set after receiving all bids to buy and offers to sell and determining the highest price at which the total offering can be sold. In this type of auction, investors place a bid for a particular financial instrument they want to buy. The bid or buy order includes a desired quantity (e.g., number of shares) and a desired per unit price. Auction processes may include, for example, opening auctions, closing auctions, or intra-day auctions. Depending on the venue and the time of day, the auction may include different order types. Example order types include limit orders, market orders, auction-only orders, other orders, or any combination or limitation thereof.

Various market centers also offer investors the opportunity to trade securities during the trading day (intra-day trading) by placing one or more orders. Example order types for intra-day trading also include limit orders, market orders, auction-only orders, other orders, or any communication or limitation thereof.

SUMMARY

Implementations of the present disclosure involve a system and/or method for fulfilling orders in which at least one order comprises a retail price improvement (RPI) order that may be used in security transactions that follow a price/time priority model. The orders may be fulfilled based upon an aggressiveness of a respective interest value relative to an interest value of the at least one RPI. According to one aspect, an exchange order fulfillment method includes an exchange order fulfillment method comprising receiving, by at least one processor, a plurality of orders for trading an underlying security, at least one of the orders comprising a retail price improvement (RPI) order having an interest value that is more aggressive than one of a protected national best bid (NBB) and a protected national best offer (NBO) of the underlying security, and fulfilling, by the at least one processor, the plurality of orders based upon an aggressiveness of a respective interest value for each of the plurality of orders relative to the one of the protected NBB and the protected NBO of the underlying security.

According to another aspect, an exchange order fulfillment system includes at least one processor to receive a plurality of orders for trading an underlying security, at least one of the orders comprising a retail price improvement (RPI) order having an interest value that is more aggressive than one of a protected national best bid (NBB) and a protected national best offer (NBO) of the underlying security, and fulfill the plurality of orders based upon an aggressiveness of a respective interest value for each of the plurality of orders relative to the one of the protected NBB and the protected NBO of the underlying security.

According to yet another aspect, a non-transitory computer-readable medium includes instructions stored thereon that, when executed by at least one processor, cause the at least one processor to perform operations comprising receiving a plurality of orders for trading an underlying security, at least one of the orders comprising a retail price improvement (RPI) order having an interest value that is more aggressive than one of a protected national best bid (NBB) and a protected national best offer (NBO) of the underlying security, and fulfilling the plurality of orders based upon an aggressiveness of a respective interest value for each of the plurality of orders relative to the one of the protected NBB and the protected NBO of the underlying security.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

FIG. 1D illustrates an order transaction table showing order detail data for example orders according to an example embodiment.

DETAILED DESCRIPTION

Implementations of the present disclosure involve a retail price improvement financial exchange system and method that includes retail price improvement (RPI) orders that may be used in security transactions that follow a price/time priority model. That is, multiple orders including one or more RPI orders placed for a given security may be fulfilled based on an aggressiveness of an interest value of each RPI order relative to an interest value of other orders. Embodiments of such a RPI order may attract additional retail order flow to the exchange system while also providing the potential for price improvement to such order flow. In this context, the term "more aggressive" means a higher interest value for a bid to buy or a lower interest value for an offer for sale.

A share, as used herein, is a unit of ownership of a financial instrument and is not limited to a unit of ownership of a stock, or other equity. The financial exchange system operates similarly to conventional financial exchanges in that records of all the trades or orders made in the financial exchange system may be logged and data from orders eligible for execution generally are listed on the exchange's book (e.g. resting shares).

Figure 1A:
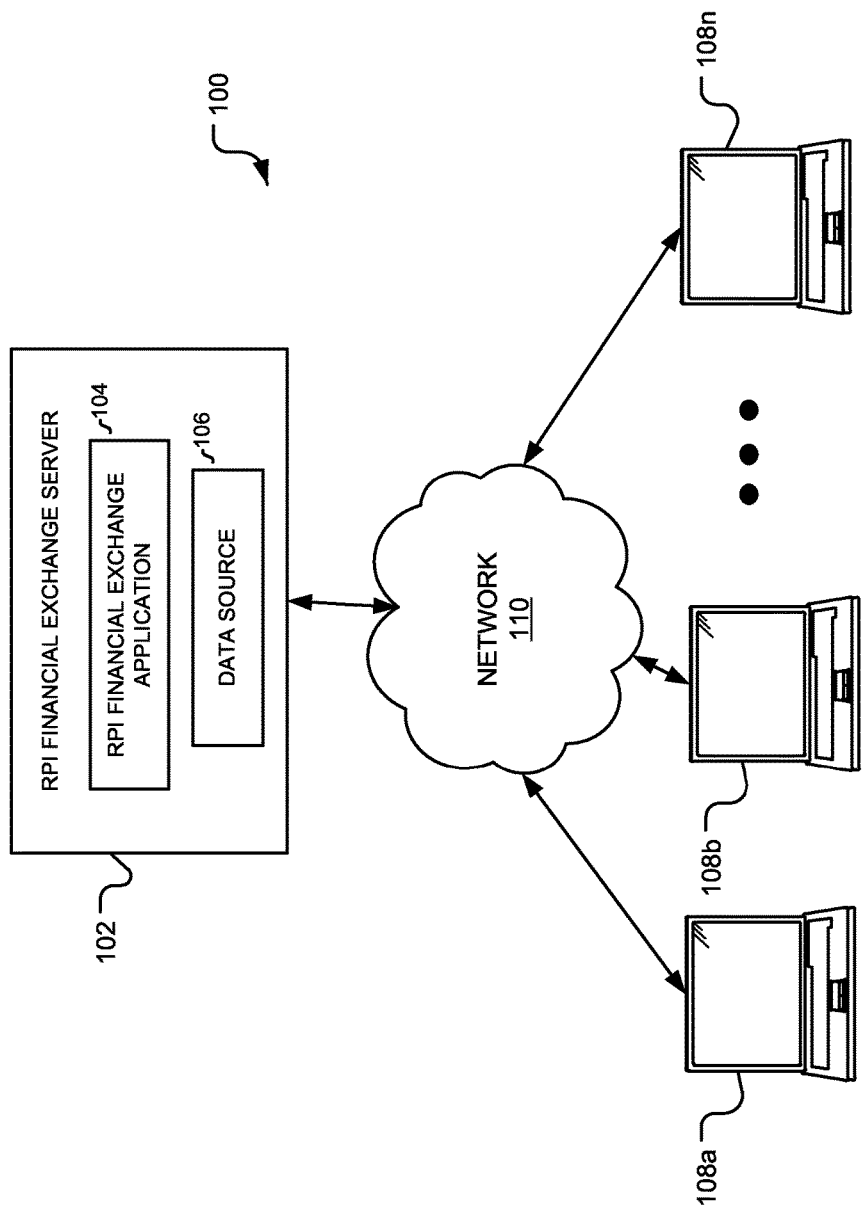
FIG. 1A is a block diagram of a retail price improvement (RPI) financial exchange system according to one aspect of the present disclosure.
Figure 1B:
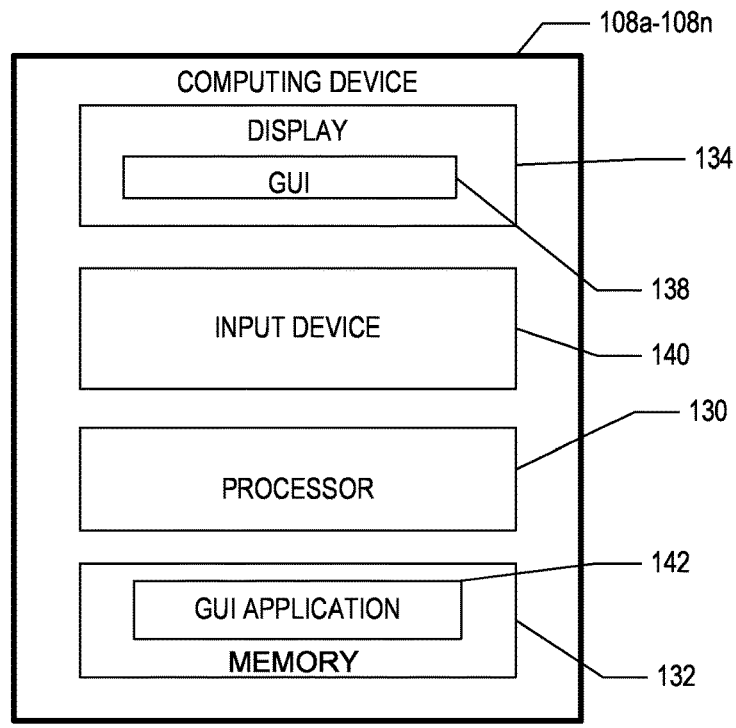
FIG. 1B depicts a block diagram of an example participant computing device according to one aspect of the RPI financial exchange system.
Figure 1C:
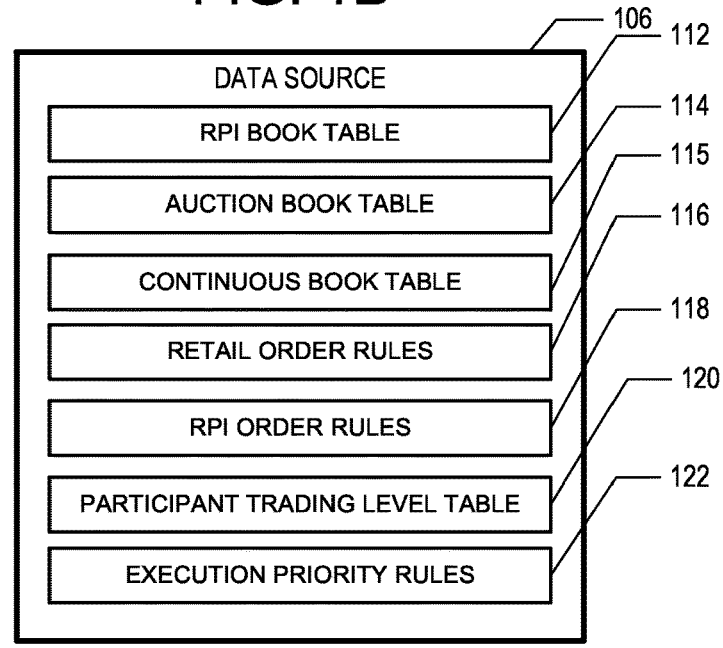
FIG. 1C depicts an example data source according to an aspect of the RPI financial exchange system.

FIGS. 1A through 1C depict an example retail price improvement (RPI) financial exchange system 100 according to aspects of the disclosure. The system 100 includes one or more RPI financial exchange servers 102 with one or more processors or other computing devices or systems that include an RPI financial exchange application 104 and a data source 106. As will be described in detail below, the RPI financial exchange application 104, among other things, receives orders including one or more retail price improvement (RPI) orders and fulfills the RPI order according to a price/time priority model. That is, the RPI financial exchange application 104 processes incoming RPI orders based upon the aggressiveness of an interest value relative to other interest values of other orders for the same security. The RPI financial exchange system 100 may operate at or in connection with an electronic financial exchange.

The server 102 is a typical server utilized by financial exchanges for processing trades as well as keeping track of trade prices and updating various types of market information. The server 102 may be a server or other computer or computing device or system that includes at least one processor, the application 104, and the data source 106 stored locally in a memory or in a memory in a remote computer or computers. The memory includes a computer readable media/medium. A server, a computer, a computer device, and a computing device are examples of computing hardware. The processor and the memory are other examples of hardware. Hardware is a physical device.

In one example, the servers 102 is associated with a financial exchange, such as a local financial exchange, and are configured to receive orders, order data, and/or other data and/or communications from and/or transmit orders, order data, and/or other data and/or communications to one or more participant computing devices using a network. In an exemplary embodiment, the orders and order data are associated with RPI orders.

According to one aspect, the server 102 includes a client communication interface (not shown). The client communication interface receives communications from and/or transmits communications to one or more market participants, servers, and/or other computers. In one example, the client communication interface provides a port for one or more market participant computing devices to enable point-to-point communications between the server 102 and a particular market participant computing device connected to that port or point-to-multipoint communications between the server 102 and multiple market participant computing devices connected to one or more ports. As a result, each of the market participant computing devices can be connected to the client communication interface via a same or different port in one embodiment. The port optionally may be a dedicated port.

One or more market participant computing devices 108a-108n may connect to the exchange system 100 using a network 110. The one or more market participant computing devices 108a-108n may be conventional computers, laptops, smart phones, or tablet computers connected to the network 110 and configured to send and receive information for conducting trades and viewing market information. The exchange system 100 may be configured to allow market participant computing devices 108a-108n to place orders for financial instruments over the network as well as view and access any trading information for various financial instruments. The server 102 includes a processor 302 (FIG. 3) that executes the RPI financial exchange application 104 stored in volatile and/or non-volatile memory 304 (e.g., computer readable media) using the data source 106. Examples of a server 102 include one or more servers, personal computers, mobile computers and/or other mobile devices, and other computing devices. The server 102 may communicate via wireless and/or wireline communications.

The application 104 receives one or more orders, order information, and/or other data and/or communications from one or more remote participant computing devices 108a-108n or other computer systems or devices via a communication network 110. The application 104 also transmits order information (such as information for executed orders or reconciliation or payment information) and/or other data and/or communications to the computing devices 108a-108n or other computer systems or devices via the communication network 110. As will be described in detail below, the financial exchange system 100 processes RPI orders using a price/time model in which the RPI orders are fulfilled according to their aggressiveness relative to the aggressiveness of other orders received by the system 100. That is, an RPI order may be fulfilled prior to a non-RPI order if its respective interest value is greater than that of the non-RPI order irrespective of its time of entry.

The data source 106 stores an RPI book table 112, an optional auction book table 114, an optional continuous book table 115, retail order rules 116, RPI order rules 118, a participant trading level table 120, and one or more execution priority rules 122. Although the data source 106 is shown as being located on, at, or within the server 102, it is contemplated that the data source 106 can be located remotely from the server 102 in other aspects of the system 100, such as on, at, or within a database of a data management system or a database of another computing device or system having at least one processor and volatile and/or non-volatile memory. In one embodiment, the data source 106 comprises a relational database management system, such as a SQL (Structured Query Language) based database system that provides a front end for entry and access of data stored therein and provides for replication for increased reliability and/or mirroring by other sites that use the financial exchange system 100.

The communication network 110 can be the Internet, an intranet, or another wired and/or wireless communication network. In one aspect, one or more of the server 102 and the computing devices 108a-108n communicate with one another using any suitable protocol or messaging scheme. For example, the server 102 and computing devices 108a-108n may communicate using a Financial Information Exchange (FIX) protocol or a Binary Order Entry (BOE) protocol, which are protocols commonly used to exchange financial information. In other aspect, the server 102 and the computing devices 108a-108n exchange data using other protocols (alone or in connection with the FIX protocol and/or the BOE protocol), such as a Hypertext Transfer Protocol (HTTP), extensible markup language (XML), extensible hypertext markup language (XHTML), or a Wireless Application Protocol (WAP) protocol. Other examples of communication protocols exist. Although the example of FIG. 1A shows the server 102 communicating with the computing devices 108a-108n through the network 110, other embodiments contemplate the server 102 communicating directly with the computing devices 108a-108n without the use of a separate and a distinct network. Additionally, other embodiments contemplate that the modules employed by the server 102 and the computing devices 108a-108n are integrated in one computing system.

The financial exchange system 100 processes trades using one or more books, such as the RPI book table 112, the auction book table 114, and/or the continuous book table 115 shown herein. A book generally includes information identifying bids to buy and offers to sell financial instruments at the financial exchange system 100 that are eligible for execution, but that have not executed. Un-executed shares on the financial exchange system's book may be referred to herein as resting shares. The financial exchange system 100 may, for example, include a continuous book for bids to buy and offers to sell one or more financial instruments at the exchange during regular trading hours, an auction book for bids to buy and offers to sell a financial instrument at the exchange during an auction (for example, an opening auction, a closing auction, an IPO auction, or another auction), an extended trading hours book for bids to buy and offers to sell a financial instrument at the exchange before and/or after regular trading hours, and/or another book for bids to buy and offers to sell a financial instrument at other times and/or at another exchange. In one aspect, the financial exchange system 100 has an order book for orders of RPI and non-RPI trades. Such an order book may be separate or part of a continuous book or other book. The financial exchange alternately may have a continuous book for continuous orders (e.g. orders received for regular trading hours), an auction book for auction orders (orders received for an auction, for example, an opening auction, a closing auction, an IPO auction, or another auction), an order book for RPI-based trades, an extended trading book for orders for execution before and/or after regular trading hours, another book for other orders, or a book combining one or more of the foregoing. Data for one or more of the books may be stored in a database or other memory. The database may be stored in the data source 106.

The RPI book table 112 includes RPI records for one or more RPI-based financial instrument orders submitted for trading. The financial exchange system 100 may have one RPI book or multiple RPI books.

The auction book table 114 includes auction records for one or more financial instrument orders submitted for trading at one or more auctions, such as an opening auction, a closing auction, an IPO, or a halt. For example, the auction book table 114 includes records for orders for opening auctions, closing auctions, and IPO and halt auctions. The financial exchange system 100 may have one auction book for one or more auctions or multiple auction books, such as an auction book for each auction.

The continuous book table 115 includes records for one or more financial instrument orders submitted for regular market day trading. For example, the continuous book table 115 may have records for market orders, limit orders, good til cancelled orders, and other types of regular trading day orders.

Referring now to FIG. 1D, an order transaction table of the RPI book table 112 shows order detail data for example RPI orders for a particular financial instrument that is received by the application 108. The RPI book table 112 includes an order number column 170, an entry time column 172, a buy shares column 174, a sell shares column 176, an order type column 178, an offset column 180, and a floor/ceiling column 182. The order transaction table may be for a financial instrument or further include a symbol or other identification for one or more financial instruments. The order number column 170 of FIG. 1D shows three RPI orders, each having a sequential order number. The entry time column 172 shows the time each order was received at the application 108. The buy share column 174 shows a quantity of buy shares, if any, requested by each order. The sell share column 176 shows a quantity of sell shares, if any, requested by each order. The order type column 178 shows the order type for each order, e.g., RPI order type. The offset column 180 shows an offset for each order, e.g., a minimum price improvement value, and the floor/ceiling column 182 shows one of a floor price and a ceiling price for the order.

The RPI orders shown in FIG. 1D also may be aggregated and stored in the RPI book table or a consolidated book table. A consolidated book table includes one or more types of orders for a financial instrument and information associated with the one or more types of orders. As an example, the orders may include RPI orders, auction orders, continuous market trading orders, and other types of orders. The consolidated book table may include other columns and/or take other forms than a table. The aggregated quantities of particular types of orders in the consolidated book table may be ordered according to a particular value, e.g., from a highest price level to the lowest price level.

Figure 2:
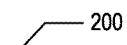
FIG. 2 depicts example message format data for an order that is structured according to a financial information exchange (FIX) protocol according to an example embodiment.

FIG. 2 illustrates example message format data for an order 200 that is structured according to a financial information exchange (FIX) protocol according to an example embodiment. The message format data for an order 200 includes various tags and corresponding fields in the FIX format. Other orders formatted according to the FIX protocol may include additional tags that are not shown in FIG. 2. In this example, the order 200 includes an order type tag 40 corresponds to a type of the financial order, an order side tag 54 corresponds to an order side, an instrument tag 55 corresponds to the instrument ID, and an MPID tag 49 may correspond to a market participant identification (MPID) associated with the participant. The particular order shown conforms to a format specified by the FIX protocol, which is a protocol commonly used to exchange financial information. RPI orders may include additional tags and the use of the tags that are not shown in FIG. 2. In other embodiments, the financial exchange system 100 may process orders that conform to any suitable protocol of information interchange.

Retail orders and RPI orders may be generated according to values assigned to certain tags of an order, such as shown in FIG. 2. For example, a retail order includes an order type tag 40 set to the value "retail" and may also include a "type 1" or "type 2" appendix to indicate that the order is either a type 1 retail order or a type 2 retail order, respectively. As another example, an RPI order includes an order type tag 40 with a value of "RPI ORDER" indicating that the order is an RPI order. The RPI order also includes an order side tag 54 indicating whether the RPI is a buy or sale order, an offset tag 24 indicating an amount of retail price improvement to be applied to the protected NBBO of an underlying security associated with the RPI order, and a floor/ceiling tag 25 indicating a limit price above/below which the participant does not wish to trade.

Participants use computing devices 108a-108n to view RPI data, auction data, and place orders (e.g., buy orders and/or sell orders). For example, the application 104 periodically (e.g., at 5 second intervals) transmits auction data to certain remote computing devices 108a-108n for display to the user. The transmitted auction data enables the user to view auction data related to one or more financial instruments, such as securities, and other financial instruments. Such auction data includes a transmission time of the auction data, financial instrument identification information (e.g., ticker symbol), an auction type, a reference price, a reference price range, reference buy shares, reference sell shares, an indicative price, and an auction only price. According to one aspect, the reference price is based on a protected NBB or a protected NBO, for example, a financial exchange BBO or a national BBO. Upon his or her discretion, the user may then issue a command through the user interface of the computing device to generate an order for buying or selling a desired financial instrument.

According to one aspect, orders received and processed by the system 100 include retail orders, retail price improvement (RPI) orders, or any combination thereof. RPI orders may be buy orders or sell orders. An RPI order generally refers to one that includes displayed or non-displayed interest on the exchange system that is more aggressive than the protected national best bid (NBB) or protected national best offer (NBO) by at least a specified minimum price improvement value. In a particular embodiment, the non-displayed interest that is $0.001 greater than the protected NBB or protected NBO for buy orders, and $0.001 less than the protected NBB or protected NBO for sell orders.

The Protected NBB is defined as the best-priced protected bid and the protected NBO is the best-priced protected offer. Generally, the protected NBB, the protected NBO, the national best bid (NBB), and a national best offer (NBO), together with a NBB, a national best bid or offer (NBBO) will be the same. However, a market center is not required to route to the NBB or NBO if that market center is subject to an exception under regulation rule 611(b)(1) of the National Market System (NMS) regulations, or if such NBB or NBO is otherwise not available for an automatic execution. In such case, the protected NBB or protected NBO would be the best-priced protected bid or offer to which a market center must route interest pursuant to rule 611 of the NMS regulations.

The financial exchange system 100 may be any system configured to administer the purchase and sale of securities. In various embodiments, the application 104 prevents retail orders (e.g., non-RPI orders) from interacting with RPI orders if the RPI order is not priced a minimum value more aggressive than the Protected NBBO. However, RPI orders more aggressive than the minimum price improvement value could be placed. For an example where the minimum specified price improvement value is $0.001, a RPI order may be placed having a price improvement value greater than $0.001, including $0.015 better than the protected NBBO. In one embodiment, the application 104 accepts RPI orders without a minimum price improvement value and an interest executes at its floor or ceiling price when such floor or ceiling price is better than the protected NBBO by the specified minimum price improvement value or more.

The price of an RPI order is determined by the following information: (1) RPI buy or sell interest; (2) an offset, if any; and (3) a ceiling or floor price. In many cases, the RPI sell or buy interest typically tracks the Protected NBBO. The offset comprises a predetermined amount by which the participant is willing to improve the Protected NBBO, subject to a ceiling or floor price. The ceiling or floor price comprises the amount above or below which the participant does not wish to trade. In one embodiment, RPI orders in their entirety (the buy or sell interest, the offset, and the ceiling or floor) will remain non-displayed. The application 104 further allows participants to enter RPI orders which establish the exact limit price, which is similar to a non-displayed limit order currently accepted by conventional exchange system except that the application 104 will accept customized amounts, such as sub-penny limit prices on RPI orders with three decimal places. The exchange system monitors whether a RPI buy or sell interest, adjusted by any offset and subject to the ceiling or floor price, is eligible to interact with incoming retail orders.

FIG. 1B depicts an example embodiment of one of the one or more a computing devices 108a-108n according to one aspect of the financial exchange system 100. The computing device 108a is a computing or processing device that includes one or more processors 130 and memory 132 to receive data and/or communications from, and/or transmit data and/or communications to, the server 102 via the communication network 110. The computing device 108a includes a display 134, such as a computer monitor, for displaying data and/or a graphical user interface 138. The computing device 108a may also include an input device 140, such as a keyboard or a pointing device (e.g., a mouse, trackball, pen, or touch screen) to enter data into or interact with the graphical user interface 138. In one embodiment, the display 134 comprises a touchscreen device receiving input provided via physical contact by the user with the touchscreen device, e.g., contact by a finger of the user with the touchscreen device.

The computing device 108a may also include a graphical user interface (or GUI) application 142, such as a browser application, or application software (e.g., a mobile app) comprising instructions stored in the memory 132 and executed by the processor 130 to generate a graphical user interface 138 to the display 134. The graphical user interface 138 enables a user of the computing device 108a to interact with the GUI application 142 to entering orders for purchase or sale of one or more securities and communicate with the server 102. The computing device 108a transmits data and messages to the server 102 and receives data and messages from the server 102. The GUI application 142 displays data and messages received from the server 102 and provides a mechanism for transmitting data and messages to the server 102. The computing device 108a may communicate via wireless and/or wireline communications.

Figure 3:
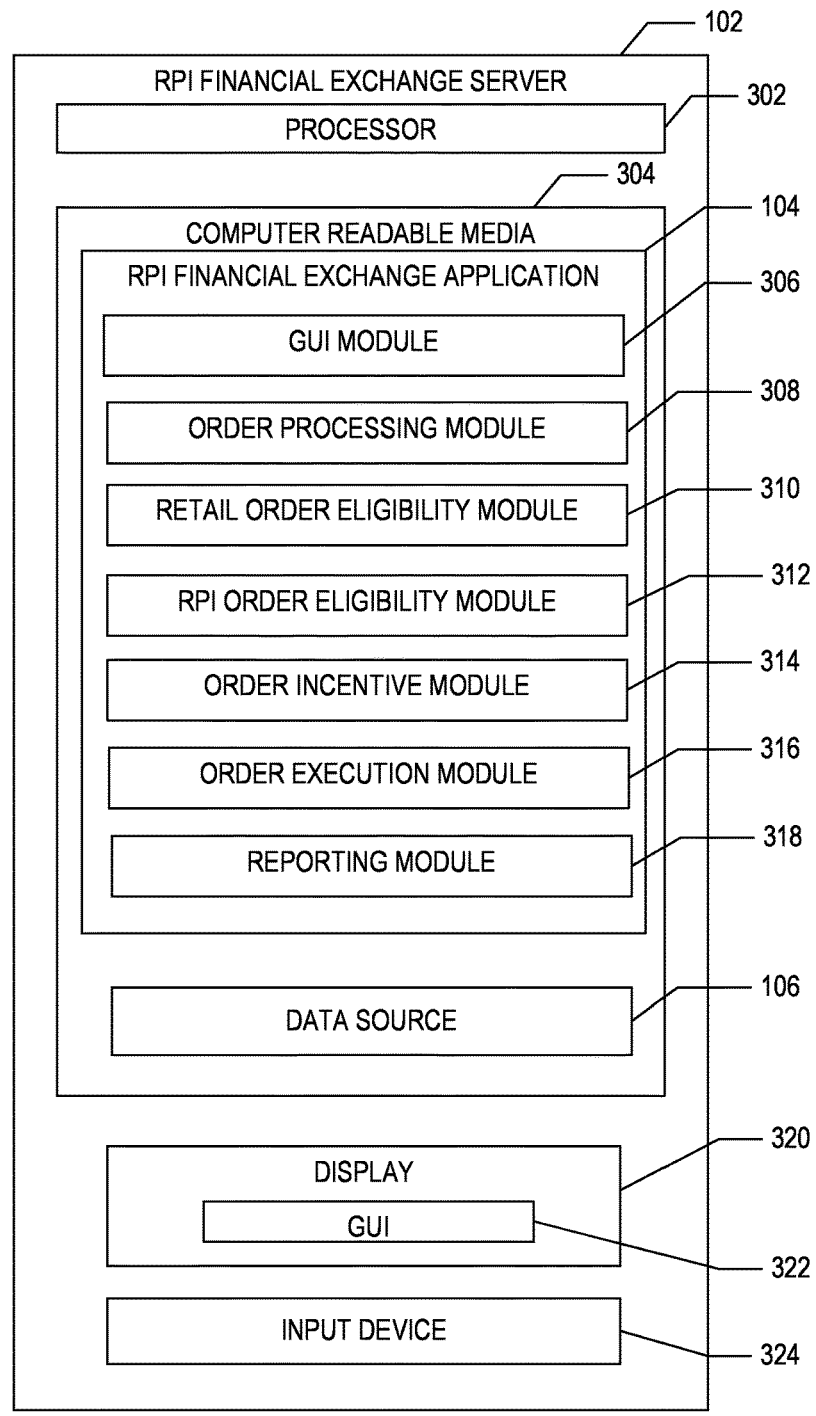
FIG. 3 is a block diagram of an RPI financial exchange server that includes an RPI financial exchange application according to an example embodiment.

FIG. 3 shows a block diagram of the RPI financial exchange server 102 with the RPI financial exchange application 104 according to an example embodiment. According to one aspect, the server 102 includes a processor 302 that includes one or more processors or other processing devices. The processor 302 is hardware. The processor 302 executes the RPI financial exchange application 104 to process financial interest order detail data received from one or more orders, which is recorded in an RPI book table 112 and/or an optional auction book table 114 and/or an optional continuous book table 115 to fulfill orders. In this context, the process of fulfilling orders refers to matching one or more buy orders with one or more sell orders and notifying parties to a trade for matched orders. Fulfilling optionally may include administrating or facilitating the transferal of the underlying financial instrument and monetary consideration associated with the orders between the interested participants.

In the particular embodiment shown, the computer readable medium 304 stores the financial exchange application 104, the RPI book table, 112, optionally the auction book table 114, and optionally the continuous book table 115. The RPI financial exchange application 104 includes instructions or modules that are executable by the processor 302 to match orders.

The computer readable medium 304 may include volatile media, nonvolatile media, removable media, non-removable media, and/or another available medium that can be accessed by the server 102. By way of example and not limitation, computer readable medium 304 comprises computer storage media and communication media. The computer storage medium includes non-transient storage memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

A GUI module 306 receives data as user input and communicates this data and/or other communications between the server 102 and the participant computing devices 108a-108n. In one example, one participant computing device 108a transmits an access request to the application 104 on the server 102 via the GUI module 306, for example, by entering order data for one or more orders via that computing device 108a. The GUI module 306 is further configured to transmit RPI and auction data that may include fulfilled orders and/or unfulfilled orders for display on the computing device 108a.

An order processing module 308 receives an order from a computing device (e.g., participant computing device 108a-108n) or other computing device. As described above, the computing device 108a transmits an order in, for example, a FIX message format or other suitable format. The order processing module 308 identifies order detail data included in the received order. For example, the order processing module 308 processes the order to determine whether the order is one of a retail order or an RPI order. The order processing module 308 then optionally stores the order detail data in the data source 106.

A retail order eligibility module 310 retrieves retail order rules 116 from the data source 106 and processes the order detail data according to the rules to determine if the order is eligible for retail processing. Retail order rules 116 specify whether orders are eligible for retail processing based on order type and/or a time that the order is received by the application 104. For example, the retail order rules specify that only participants classified in a certain participant trading level (e.g., a member trading level) may submit retail orders. As another example, the application 104 uses the retail order rules 116 to ensure that each retail order or an ongoing group of retail orders meets certain criteria. For example, retail orders may refer to an agency order that originates from a natural person and is submitted to the exchange by a member participant, provided that no change is made to the terms of the order with respect to price or side of market and the order does not originate from a trading algorithm or any other computerized methodology.

In one embodiment, market participants could qualify for membership if they conduct a retail business or handle retail orders on behalf of another broker-dealer. To qualify, the participant wishing to obtain member status submits several elements of information, such as an application form, an attestation in a form prescribed by the exchange organization that any order submitted by the participant as a retail order would meet the qualifications for such orders under proposed Rule 11.24 of the NMS regulations, and/or supporting documentation sufficient to demonstrate the retail nature and characteristics of the applicant's order flow. For example, a prospective member participant provides sample marketing literature, website screenshots, other publicly disclosed materials describing the retail nature of their order flow, and such other documentation and information as the exchange organization may require providing reasonable assurance that the applicant's order flow would meet the requirements of the retail order definition.

Additionally, if the participants are accepted as member participants, they may be required to have written policies and procedures reasonably designed to assure that it will only designate orders as retail orders if all requirements of a retail order are met. Such written policies and procedures may require the member to: (i) exercise due diligence before entering a retail order to assure that entry as a retail order is in compliance with the requirements of this rule, and (ii) monitor whether orders entered as retail orders meet the applicable requirements. If the member participant represents retail orders from another broker-dealer customer, the member participant's supervisory procedures must be reasonably designed to assure that the orders received from such broker-dealer customer that it designates as retail orders meet the definition of a retail order. The member participant may (i) obtain an annual written representation, in a form acceptable to the exchange organization, from each broker-dealer customer that sends it orders to be designated as retail orders that entry of such orders as retail orders will be in compliance with the requirements of this rule, and (ii) monitor whether its broker-dealer customer's retail order flow continues to meet the applicable requirements. The exchange organization or another self-regulatory organization on behalf of the exchange organization reviews member participants' compliance with these requirements through an exam-based review of each member participant's internal controls.

Although any member may request member status, the member status may be disapproved by the exchange organization. In the event that the exchange organization disapproves the application, the exchange organization provides a written notice to the member participant. The disapproved applicant may appeal the disapproval by the exchange organization using any suitable procedure. For example, the member participant may appeal the disapproval as provided in specified in rule 11.24(d) of the National Market System (NMS) regulations, and/or reapply for member status at a specified period of time (e.g., 90 days) after the disapproval notice is issued by the exchange organization. Additionally, a member participant also could voluntarily withdraw from such status at any time by giving written notice to the exchange organization.

Decisions to approve participants for member status may be made by a RPI panel. The RPI panel may include the exchange organization's Chief Regulatory Officer (CRO), or a designee of the CRO, and two officers of the exchange organization designated by the Chief Operating Officer (COO). The RPI Panel reviews the facts and renders a decision within the time frame prescribed by the exchange organization. The RPI Panel may overturn or modify an action taken by the exchange organization and all determinations by the RPI Panel constitute final action by the exchange organization on the matter at issue.

Member participants are required to abide by certain trading requirements, such as those specified in Rule 11.24 (c) in the NMS regulations. If a member participant designates orders submitted to the exchange system as retail orders and the exchange organization determines, in its sole discretion, that those orders fail to meet any of the requirements of retail orders, the exchange organization may disqualify a member from its status as a member participant. When disqualification determinations are made, the exchange organization provides a written disqualification notice to the member. A disqualified member participant may appeal the disqualification as provided in Rule 11.24(d) of the NMS regulations and/or reapply for member status at a specified period of time (e.g., 90 days) after the disqualification notice is issued by the exchange organization. According to one aspect, the auction eligibility module 310 stores a participant trading level table 120 that indicates for participants and an order trading level classification. Using this table, the retail order eligibility module 310 determines whether the participant may enter retail orders, and/or submit RPI orders having a minimum margin for member participants.

Information associated with the qualifications for member participants described above are stored in the retail order rules 116 and accessed by the retail order eligibility module 310 to verify compliance of member participants to these rules when retail order are submitted to the system 100.

An RPI order eligibility module 312 retrieves RPI order rules 118 from the data source 106 and processes the RPI order detail data according to the rules to determine if the RPI order is eligible for RPI processing. RPI order rules 118 specify whether orders are eligible for RPI processing based on one or more criteria associated with RPI orders. For example, the RPI order eligibility module 312 determines whether the offset value associated with the RPI order meets a minimum margin (e.g., a spread) that is more aggressive than the protected NBB or NBO of the underlying financial instrument.

All exchange participants (e.g., member participants and non-member participants) may be permitted to submit RPI orders for contra-side retail orders that are each better than the national best bid that is a Protected Quotation ("Protected NBB") or the national best offer that is a Protected Quotation ("Protected NBO", and together with the Protected NBB, the "Protected NBBO"). However, a member participant may generate RPI orders having a lower minimum price improvement value than other classes of investors. In one embodiment, submitted RPI orders may be non-displayed. That is, the bid or offer price of the RPI order is not open for public inspection until or unless the order is consummated with contra-side interest.

As another example, the RPI order eligibility module 312 rejects RPI orders when the protected NBB or the protected NBO of the underlying security is less than a specified value. Although all securities traded on the exchange system may be implemented with RPI orders, the RPI orders are limited to those securities having a certain specified price (e.g., $1.00 per share). Toward that end, the RPI eligibility module 312 prevents the interaction of an RPI buy or sell interest (adjusted by any offset) and retail orders at a price below $1.00 per share. As discussed above, the price of an RPI order would be determined by a participant's entry of buy or sell interest, an offset (if any) and a ceiling or floor price.

In addition to facilitating an orderly and operationally intuitive trading platform, limiting RPI orders to securities equal to or greater than $1.00 per share may enable the exchange organization to focus its efforts on monitoring price competition and to assess any indications that data disseminated under the Program is potentially disadvantaging retail orders. Given this limitation, RPI orders may exhibit reduced impact on the minimum pricing increment for orders priced less than $1.00 and therefore no effect on the potential of markets executing those orders to lock or cross. In addition, the non-displayed nature of the liquidity in the underlying securities has no potential to disrupt displayed, protected quotes. In any event, auctions implementing RPI orders would not unduly affect the obligation of exchanges to avoid and reconcile locked and crossed markets under Rule 610(d) of the NMS regulations.

A RPI order incentive module 314 generates one or more incentives, such as monetary incentives to promote the use of RPI orders by the participants. The RPI order incentive module 314 retrieves RPI order rules 118 from the data source 106 and uses the RPI order rules 118 to evaluate concurrently placed RPI orders. For example, the RPI order incentive module 314 charges participants a fee for executions of RPI orders against retail orders (e.g., non-RPI order) and in turn provides a credit or free executions to member participants for executions of their retail orders against RPI orders. As explained above, the application 104 executes incoming retail orders against all available contra-side orders provide price improvement to the retail order, including non-displayed orders other than RPI orders. In the event a non-displayed interest other than an RPI order interacts with a retail order, the RPI incentive module 314 charges the participant that entered such non-displayed interest the same fee as is imposed for an RPI order execution. In such cases, the fee charged to the participant that entered the non-displayed interest will likely be greater than the fee charged that same participant for an execution against a non-RPI order.

The order execution module 316 fulfills one or more buy orders with one or more sell orders at an RPI execution price. The order execution module 316 uses one or more execution priority rules 122 when fulfilling the orders. In one embodiment, the order execution module 316 matches one or more RPI buy/sell orders using a price/time priority model. The price/time priority model generally refers to an order matching scheme in which at least one RPI order placed for a given security may be fulfilled based on the aggressiveness of the interest value of each order relative to the interest value of other RPI orders. That is, an RPI order may be fulfilled ahead of other non-RPI orders or RPI orders when its interest value is more aggressive than these other orders.

An order execution reporting module 318 publishes information associated with the use of RPI orders. Within this context, the term "publish" means to disseminate or otherwise transmit information about trades conducted with RPI orders for consumption by participants who use the system 100 or others who may wish to observe the use of the system 100. For example, the order execution reporting module 318 publishes a retail liquidity identifier that indicates a relative liquidity of securities traded using RPI orders. The retail liquidity identifier may be published using any suitable communication means. For example, information associated with trades conducted with RPI orders may be published pursuant to the Consolidated Tape Association Plan/Consolidated Quotation Plan, or CTA/CQ, for Tape A and Tape B securities, and the NASDAQ™ UTP Plan or consolidated public market data stream for Tape C securities. In particular, these outputs may include one or more fields for codes related to the RPI identifier.

According to another aspect, the server 102 also optionally includes a display 320, such as a computer monitor, for displaying data and/or a graphical user interface 322. The server 102 may also optionally include an input device 324, such as a keyboard or a pointing device (e.g., a mouse, trackball, pen, or touch screen) to enter data into or interact with the graphical user interface 322.

It should be appreciated that the modules described herein are provided only as an example of a computing device that may execute the financial exchange application 104 according to the teachings of the present disclosure, and that other computing devices may have the same modules, different modules, additional modules, or fewer modules than those described herein. For example, one or more modules as described in FIG. 3 may be combined into a single module. As another example, certain modules described herein may be encoded and executed on other computing devices, such as a computing device 108a used by a participant. Further, one or more or all of the modules may be stored and executed by the financial exchange server 102 and data and instructions are transmitted to and from the financial exchange server 102 and the computing devices 108a-108n to execute their functions.

Figure 4:
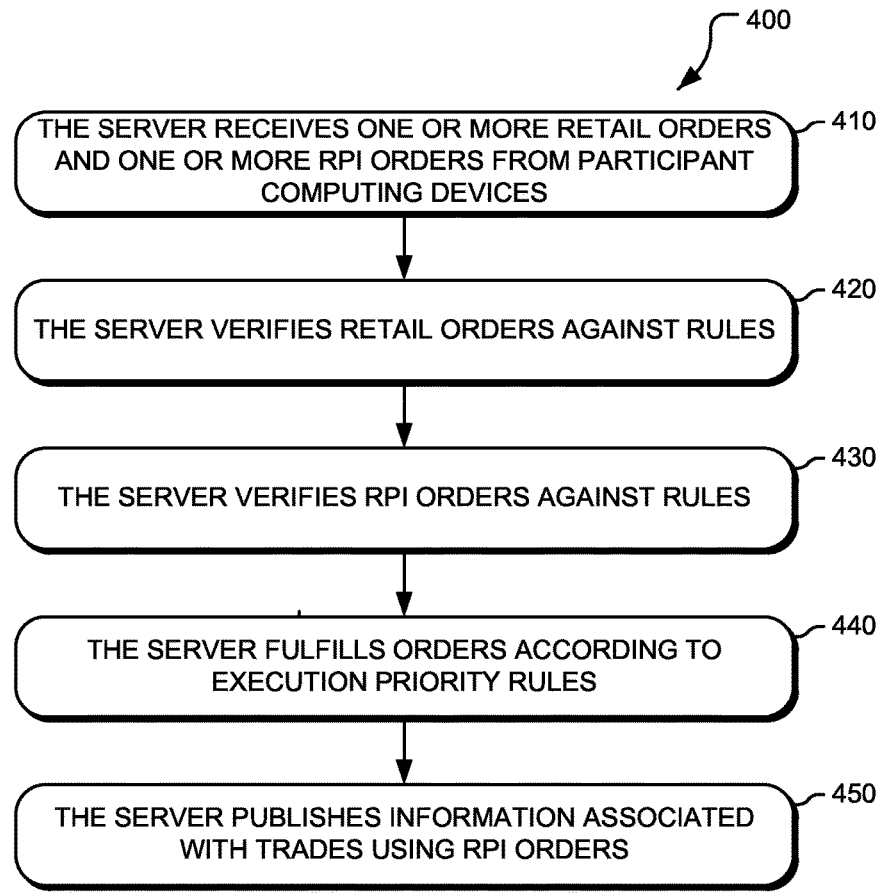
FIG. 4 is a flowchart depicting an example process for fulfilling a trade using a RPI order according to an example embodiment.

FIG. 4 depicts an example process 400 that may be performed by the RPI financial exchange application 104 of the RPI financial exchange system 100 according to one embodiment of the present disclosure. The RPI financial exchange system 100 operates similar to a conventional electronic financial exchange in that it provides an electronic exchange for matching orders of market participants to buy and sell various securities. FIG. 4, more specifically, illustrates an operation of the RPI financial exchange application 104 executing on the processor 302 of the RPI financial exchange system 100 for trading securities or other financial interests. The process 400 shown in FIG. 4 begins at step 410.

At step 410, the application 104 receives multiple orders for bids and asks for shares of securities or other financial interests. According to one aspect, the orders include one or more retail orders and one or more RPI orders. The RPI orders include for example, an interest value, an optional offset, and a ceiling or floor price that is an amount above or below, respectively, which the participant does not wish to trade.

Non-member participants and member participants may enter odd lots, round lots or mixed lots as RPI orders and as retail orders respectively. RPI orders are ranked and allocated according to price and time of entry into the exchange system consistent with exchange rule 11.12 of the NMS regulations and therefore without regard to whether the size entered is an odd lot, round lot or mixed lot amount. Similarly, retail orders will interact with RPI orders according to certain priority and allocation rules without regard to whether they are odd lots, round lots or mixed lots. Finally, retail orders may be designated as Type 1 or Type 2 without regard to the size of the order. In accordance with rules of the consolidated tape plans, executions less than a round lot will not print to the consolidated tape or be considered the last sale.

At step 420, the financial exchange system 100 verifies retail orders against the retail order rules 116 stored in the data source 106. For example, retail orders may only be submitted by member participants who have been previously vetted by the exchange. Upon receipt of a retail order, the application 104 accesses the participant trading level table 120 to verify that the participant submitting the retail order is authorized to submit such an order. As another example, retail orders may be constantly monitored to ensure that the retail orders meet the definition of retail orders. That is, the application 104 compares incoming retail orders with the retail order rules 116 stored in the data source 106 to ensure that the retail orders meet the criteria. As an example, the application 104 verifies that submitted retail orders are not used for price-gouging such that speculation is made over the bid/ask spread of the underlying security when RPI orders are used as contra-side interest.

In one embodiment, retail orders may be submitted as type 1 or type 2 retail orders. Type 1 or type 2 orders generally indicate interaction with available contra-side interests. A type 1 retail order interacts with available contra-side RPI orders and other price improving liquidity but does not interact with other available contra-side interests in the exchange system or route to other markets. The portion of a type 1 retail order that does not execute against contra-side RPI orders or other price improving liquidity would be immediately and automatically cancelled. Alternatively, a Type 2 retail order interacts first with available contra-side RPI orders and other price improving liquidity and then any remaining portion of the retail order would be executed as an Immediate or Cancel (IOC) order pursuant to Rule 11.9(b)(1) of the NMS specification. A type 2 retail order can either be submitted as an exchange only order or as an order eligible for routing to other exchanges pursuant to Rule 11.13(a)(2) of the NMS regulations. Accordingly, a type 2 retail order interacts with other interests in the exchange and, if designated as eligible for routing, would route to other markets in compliance with the NMS regulations.

At step 430, the financial exchange system 100 verifies incoming RPI orders against one or more RPI order rules 118 stored in the data source 106. For example, the application 104 verifies that RPI orders are limited to those securities having a protected NBBO price greater than a specified amount, such as $1.00 per share. For example, if there was an RPI buy order tracking the Protected NBB at $0.99 with an offset of $0.001 and a ceiling of $1.02, the RPI order eligibility module 310 prevents the execution of the RPI order at $0.991 with a sell retail order with a limit of $0.99. However, if the retail order was a Type 2 order, the order would be able to interact at $0.99 with liquidity outside the exchange's order book. Type 2 retail orders are treated as immediate or cancel (IOC) orders that execute against displayed and non-displayed liquidity in the exchange's order book where there is no available liquidity in the exchange. Type 2 retail orders can either be designated as eligible for routing to other exchanges or limited to the exchange administering the system 100 only, and thus non-routable, as described above. As another example, the application 104 verifies that the protected NBBO of the security each RPI order does not exceed the floor or ceiling limit of the RPI order.

At step 440, the application 104 fulfills the orders according to one or more execution priority rules 122 stored in the data source 106. According to one aspect, the application 104 fulfills the orders according to a price/time priority model. That is, the application 104 fulfills RPI orders according to their interest value relative to the interest values of the other orders irrespective of the time in which the orders were entered. The application 104 fulfills the orders based upon the aggressiveness of their respective interest values relative to the interest value of any RPI orders. For example, a buy RPI order, although received after a buy non-RPI order, may be fulfilled prior to the buy non-RPI order if the buy RPI order has an interest value greater than that of the non-RPI order. Conversely, a sell RPI order, although received after another sell non-RPI order, may be fulfilled prior to the sell non-RPI order if the buy RPI order has an interest value less than that of the sell non-RPI order.

RPI orders may interact with retail orders as follows. Assume a participant enters an RPI sell order with an offset of $0.001 and a floor (e.g., lower limit) of $10.10 while the Protected NBO is $10.11. The RPI order could interact with an incoming buy retail order at $10.109. If, however, the Protected NBO was $10.10, the RPI order could not interact with the retail order because the price required to deliver the minimum $0.001 price improvement ($10.099) would violate the participant's floor (e.g., lower limit) of $10.10. If a participant otherwise enters an offset greater than the minimum required price improvement and the offset would produce a price that would violate the Participant's floor, the offset would be applied only to the extent that it respects the floor value of the RPI order.

By way of illustration, an example RPI buy interest is entered with an offset of $0.005 and a ceiling (e.g. upper limit) of $10.112 while the Protected NBB is at $10.11. The RPI order could interact with an incoming sell retail order at $10.112, because the order produces the required price improvement without violating the ceiling value of the RPI order, but could not interact above the $10.112 ceiling. Finally, if an RPI order is entered without an offset (e.g., an explicitly priced limit order), the RPI order interacts with retail orders at the level of the participant's limit price as long as the minimum required price improvement is produced. Accordingly, if RPI sell interest is entered with a limit price of $10.098 and no offset while the Protected NBO is $10.11, the RPI order could interact with the retail order at $10.098, producing $0.012 of price improvement. The application 104 will not cancel RPI interest when it is not eligible to interact with incoming retail orders. Rather, such RPI interest remains in the exchange system and may become eligible again to interact with other retail orders depending on the Protected NBB or Protected NBO.

In various embodiments, RPI orders received by the application 104 are ranked and allocated according to price and then to time of entry into the exchange system. That is, the exchange system fulfills RPI orders in a price/time priority model. Any remaining unexecuted RPI interest remains available to interact with other incoming retail orders if such interest is at an eligible price. As an example in which a protected NBO for a particular security ranges from $10.00 to $10.05, a first RPI order is entered to buy the security at $10.015 for 500, a second RPI order is entered to buy ABC at $10.02 for 500, and a third RPI order is entered to buy ABC at $10.035 for 500. An incoming retail order to sell the security for 1,000 executes first against the third RPI order's bid for 500 at $10.035, because it is the best priced bid, then against the second RPI order's bid for 500 at $10.02, because it is the next best priced bid. The first RPI order is not filled because the entire size of the retail order to sell 1,000 is depleted. Thus, the retail order executes against RPI orders according to the price/time priority model.

However, assume the same facts above, except that the second RPI order to buy the security at $10.02 is for 100. The incoming retail order to sell 1,000 executes first against the third RPI order's bid for 500 at $10.035, because it is the best priced bid, then against the second RPI order's bid for 100 at $10.02, because it is the next best priced bid. The first RPI order then receives an execution for 400 of its bid for 500 at $10.015, at which point the entire size of the retail order to sell 1,000 is depleted.

As another example, assume the same facts as above, except that the third order was not an RPI order to buy ABC at $10.035; but rather, a non-displayed order to buy ABC at $10.03. The result would be similar to the result immediately above, in that the incoming retail order to sell 1,000 executes first against the third order's bid for 500 at $10.03, because it is the best priced bid, then against the second RPI order's bid for 100 at $10,02, because it is the next best priced bid. The first RPI order then receives an execution for 400 of its bid for 500 at $10,015, at which point the entire size of the retail order to sell 1,000 is depleted.

At step 450, the application 104 publishes information associated with the use of RPI orders. According to one aspect, the exchange organization produces ongoing data associated with the use of RPI orders, which may include statistics about participation, the frequency and level of price improvement provided by the RPI orders, and any effects on the broader market structure.

According to one aspect, the application 104 publishes information, such as a retail liquidity identifier when RPI interest is priced more aggressively than the minimum price improvement value is better than the exchange's Protected Bid or Protected Offer for a particular security is available in the exchange system. The retail liquidity identifier may be published through consolidated data streams as well as through proprietary exchange data feeds. For example, the retail liquidity identifier may be published pursuant to the Consolidated Tape Association Plan/Consolidated Quotation Plan, or CTA/CQ, for Tape A and Tape B securities, and the NASDAQ™ UTP Plan or consolidated public market data stream for Tape C securities. The retail liquidity identifier may reflect the symbol and the side (buy or sell) of the RPI orders, but may not necessarily include the price or size of the RPI orders. In particular, CQ and UTP quoting outputs may include a field for codes related to the retail Price Improvement Identifier. The codes may indicate RPI orders that are priced better than the exchange's Protected Bid or Protected Offer by at least the minimum level of price improvement.

Figure 6:
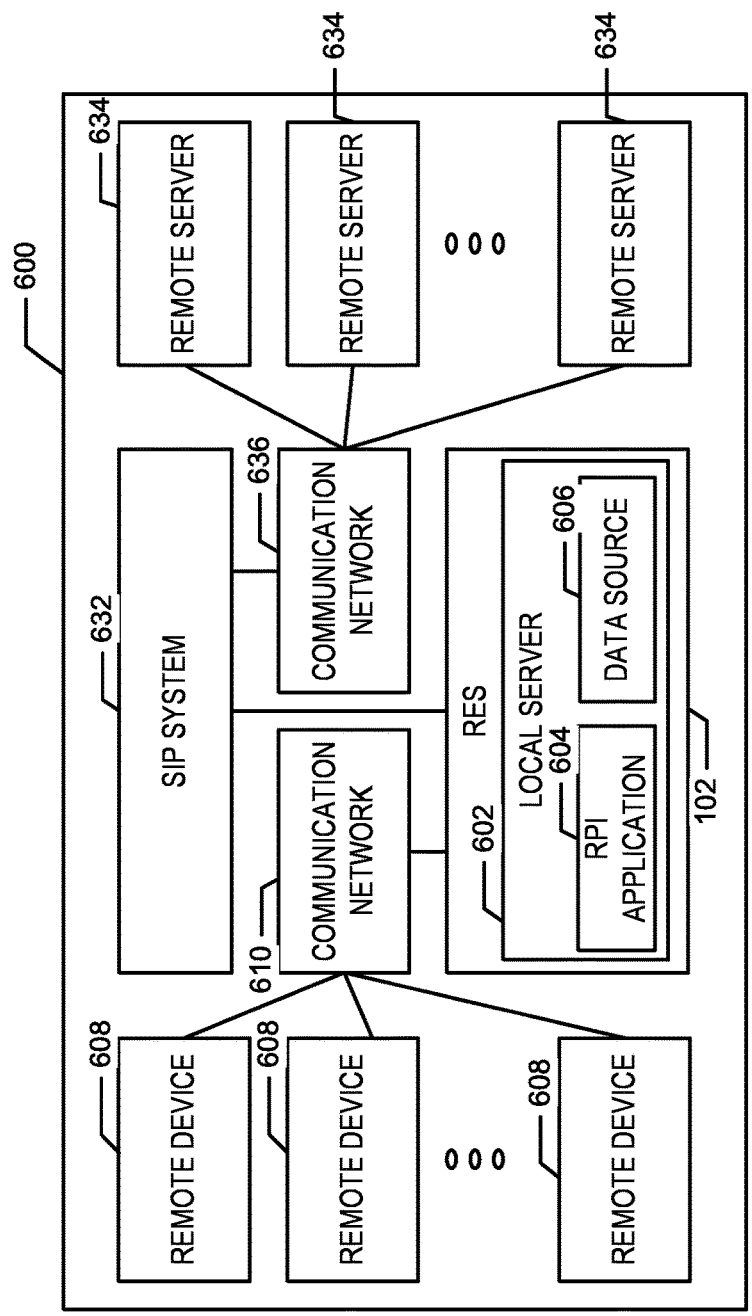
FIG. 6 depicts an exemplary financial exchange computing system that includes an RPI financial exchange system in accordance with example embodiments.

FIG. 6 depicts another exemplary financial exchange computing system 600 that includes the RPI financial exchange system (RES) 102 in accordance with example embodiments. The RES 102 includes a server (local server) 602 or other computer or computing device or system that includes an RPI application 604 and a data source 606. A server, a computer, a computer device, and a computing device are examples of computing hardware. A processor is another example of hardware. Hardware is a physical device.

The RES 102 receives one or more orders, order information, and/or other data and/or communications from one or more remote computing devices (remote device) (e.g., remote device #1-#N) 608 or other computer systems or devices via a communication network 110. The RES 102 transmits order information (such as information for executed orders, reward or other incentive data, or payment information) and/or other data and/or communications to the computing devices (e.g., remote device #1-#N) 608 or other computer systems or devices via the communication network 610.

The RES 102 transmits orders, order information, market data, incentive data, and/or other data and/or communications to a Security Information Processor (SIP) system 132 and receives orders, order information, market data, incentive data, and/or other data and/or communications from the SIP system.

The local server 602 is associated with a financial exchange, such as a local financial exchange, and is configured to receive orders, order data, incentive data, and/or other data and/or communications from and/or transmit orders, order data, incentive data, and/or other data and/or communications to the one or more remote devices 608 through a communication network 610. The local server 602 includes one or more processors and volatile and/or non-volatile memory and executes the RPI application 604, such as to process RPI-based orders. Examples of a local server 602 include one or more servers, personal computers, mobile computers and/or other mobile devices, and other computing devices. The local server 602 communicates via wireless and/or wireline communications.

The local server 602 receives data and/or communications from and/or transmits data and/or communications to the SIP system 632, such as directly or through a communication network.

According to one aspect, the local server 602 includes a client communication interface (not shown). The client interface provides a port for one or more remote devices 608 to enable point-to-point communications between the local server 602 and a particular remote device 608 connected to that port or point-to-multipoint communications between the server and multiple remote devices connected to one or more ports. As a result, each of the multiple remote devices 608 can be connected to the client interface via a different port in one embodiment. The port optionally may be a dedicated port.

Optionally, the local server 602, or the RPI application 604 executing on the local server 602, periodically stores and/or aggregates orders, order data, market data, incentive data, and/or other data. The local server 602, for example, receives consolidated BBO information identifying a BBO, receives raw order data from which it calculates a BBO, and/or uses order information for financial instruments executing on an exchange from which it calculates a BBO (alone or in combination with other data). The local server 602 optionally stores order data for orders displayed to and/or executed on the exchange in an exchange book and optionally stores BBO information and/or other market data, for example, in a consolidated book table.

The data source 606 stores order information (data), market information (data), incentive information (data), and/or other data. For example, according to one aspect, the data source 606 stores order detail data (described below) for each order received at the local server 602 from the one or more remote devices 608. The data source 606 may also store order data, market data, incentive data, and other data received from the SIP system 632.

Although the data source 606 is shown as being located on, at, or within the local server 602, it is contemplated that the data source 606 can be located remotely from the local server 602 in other aspects of the RES 102, such as on, at, or within a database of another computing device or system having at least one processor and volatile and/or non-volatile memory.

The remote devices 608 each have one or more processors and volatile and/or non-volatile memory. Examples of a remote device 608 include one or more personal computers, mobile computers and/or other mobile devices, and other computing devices. The remote devices 608 each communicate via wireless and/or wireline communications.

The remote servers 634 each have one or more processors and volatile and/or non-volatile memory. Examples of a remote server include one or more servers, personal computers, mobile computers, and/or other mobile devices, and other computing devices. The remote servers 634 each communicate via wireless and/or wireline communications.

The SIP system 632 transmits orders, order information, market data, incentive data, and/or other data to one or more remote exchange servers (e.g., remote servers #1-#N 634) via a communication network 636 and/or to the local server 602. The SIP system 632 also receives orders, order information, incentive data, market data, and/or other data from one or more remote exchange servers (e.g., remote servers #1-#N 634) via the communication network and/or to the local server 602.

The communication networks 610, 636 can be can be the internet, an intranet, and/or another wired and/or wireless communication network. In one aspect, one or more of the local server 602, the remote devices 608, the remote server 634, and/or the SIP system 632 communicate data in packets, messages, or other communications using a Financial Information Exchange (FIX) protocol, which is a protocol commonly used to exchange financial information. In another aspect, one or more of the local server 602, the remote devices 608, the remote servers 634, and/or the SIP system 632 exchange data using other protocols (alone or in connection with the FIX protocol), such as a Hypertext Transfer Protocol (HTTP) or a Wireless Application Protocol (WAP). Other examples of communication protocols exist.

Figure 5:
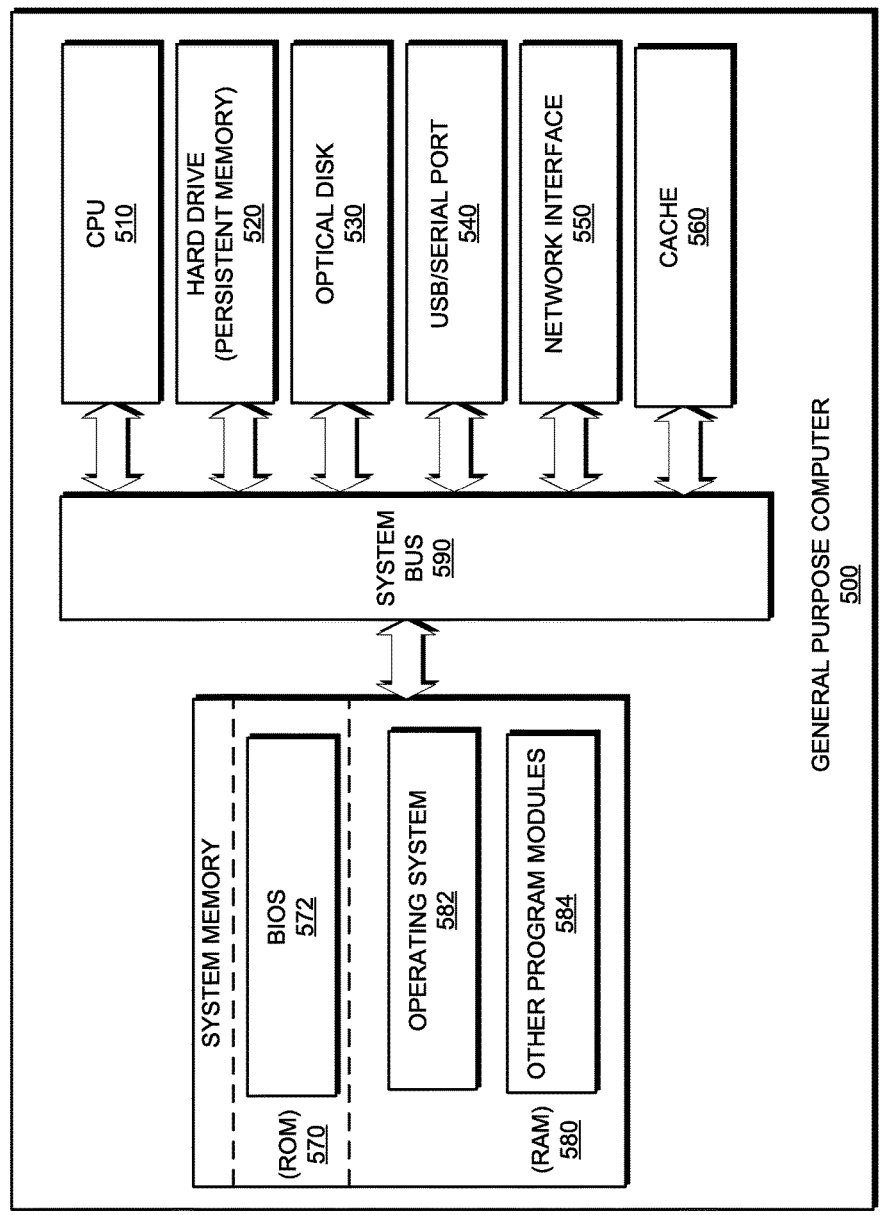
FIG. 5 is a block diagram depicting a general purpose computer that may be used in accordance with the present disclosure.

FIG. 5 illustrates an example general purpose computer 500 that may be useful in implementing the described technology, such as the financial exchange application 104 executed by the processor 302 of the financial exchange server 102. The example hardware and operating environment of FIG. 5 for implementing the financial exchange server 102 and financial exchange application 104 executed by the processor 302 appropriate counterparts include various computing devices, such as general purpose computing devices in the form of personal computers, servers, or other types of computing devices. As shown in FIG. 5, for example, the general purpose computer 500 includes a processor 510, a cache 560, a system memory 570, 580, and a system bus 590 that operatively couples various system components including the cache 560 and the system memory 570, 580 to the processor 510. The general purpose computer 500 may include one or more than one processors 510, such that the processor of general purpose computer 500 comprises a single central processing unit (CPU), or a plurality of processing units, commonly referred to as a parallel processing environment. The general purpose computer 500 may be a conventional computer, a distributed computer, or any other type of computer.

The system bus 590 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 570 and random access memory (RAM) 580. A basic input/output system (BIOS) 572, containing the basic routines that help to transfer information between elements within the storage system 200 such as during start-up, is stored in ROM 570. The general purpose computer 500 further includes a hard drive 520 such as a hard disk drive or solid state disk drive, for reading from and writing to a persistent memory such as a hard disk, not shown and an optical disk drive 530 for reading from or writing to a removable optical disk such as a CD ROM, DVD, or other optical media.

The hard disk drive 520 and optical disk drive 530 are connected to the system bus 590. The drives and their associated computer-readable media provide nonvolatile storage of computer-readable instructions, data structures, program engines, and other data for the general purpose computer 500. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, optical disk, ROM 570, or RAM 580, including an operating system 582 and one or more application programs 584. A user may enter commands and information into general purpose computer 500 through input devices such as a keyboard and pointing device connected to the USB or Serial Port 540. These and other input devices are often connected to the processor 510 through the USB or serial port interface 540 that is coupled to the system bus 590, but may be connected by other interfaces, such as a parallel port. A monitor or other type of display device may also be connected to the system bus 590 via an interface, such as a video adapter 560. In addition to the monitor, computers typically include other peripheral output devices (not shown), such as speakers and printers.

The general purpose computer 500 may operate in a networked environment using logical connections to one or more remote computers. These logical connections are achieved by a network interface 550 coupled to or a part of the general purpose computer 500; the embodiments are not limited to a particular type of communications device. The remote computer may be another computer, a server, a router, a network PC, a client, a peer device, or other common network node, and typically includes many or all of the elements described above relative to the general purpose computer 500. The logical connections include a local-area network (LAN) a wide-area network (WAN), or any other network. Such networking environments are commonplace in office networks, enterprise-wide computer networks, intranets and the Internet, which are all types of networks.

The network interface 550, which may be internal or external, is connected to the system bus 590. In a networked environment, programs depicted relative to the general purpose computer 500, or portions thereof, may be stored in the remote memory storage device. It is appreciated that the network connections shown are example and other means of and communications devices for establishing a communications link between the computers may be used.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. An exchange order fulfillment method comprising:
 receiving, by at least one processor of an electronic exchange, a plurality of electronic communications from participant computing devices via a communication network, each of the participant computing devices in communication with a particular port provided by the electronic exchange, the communications comprising orders for trades of one or more financial instruments in a message format comprising one or more tags and associated with one of Financial Information Exchange (FIX) protocol and Binary Order Entry (BOE) protocol, at least one of the orders from one of the participant computing devices comprising a plurality of tags identifying a financial instrument for a trade, an order side, and an amount of price improvement to be applied to one of a protected national best bid (NBB) or a protected national best offer (NBO) of the financial instrument for the trade;

fulfilling, by the at least one processor, the at least one order when the amount of the price improvement is more aggressive than a specified value of aggressiveness relative to the one of the protected NBB or the protected NBO of the financial instrument; and reporting information associated with fulfillment of the at least one order to the one of the participant computing devices in the message format using the particular port or to a consolidated data stream at a particular interval of time for display on a user interface of the one of the participant computing devices.

2. The exchange order fulfillment method of claim 1, wherein the at least one order comprises a buy order having an interest value that is greater than the protected NBO.

3. The exchange order fulfillment method of claim 1, wherein the at least one order comprises a sell order having an interest value that is less than the protected NBB.

4. The exchange order fulfillment method of claim 1, further comprising receiving a plurality of the orders from at least one participant computing device for a participant classified in at least two participant trading levels.

5. The exchange order fulfillment method of claim 4, further comprising rejecting the at least one order when the amount of price improvement of the at least one order is less aggressive than the specified value of aggressiveness of the one of the protected NBB or the protected NBO, the specified value of aggressiveness for each of the at least two participant trading levels being different from one another.

6. The exchange order fulfillment method of claim 5, wherein the participant trading levels comprise a member trading level and a non-member trading level.

7. The exchange order fulfillment method of claim 6, wherein the member trading level has a first amount of price improvement that is less than a second amount of price improvement of the non-member trading level.

8. The exchange order fulfillment method of claim 5, further comprising accepting orders from participant computing devices for participants classified at a specified participant trading level.

9. The exchange order fulfillment method of claim 1, further comprising rejecting the at least one order when the amount of price improvement of the at least one order is less aggressive than the specified value of aggressiveness of the one of the protected NBB or the protected NBO.

10. The exchange order fulfillment method of claim 1, wherein a participant is charged a fee for placing a price improvement order against a non-price improvement order and is provided with a monetary credit for placing the non-price improvement order against the price improvement order.

11. The exchange order fulfillment method of claim 1, further comprising publishing a liquidity identifier identifying a symbol and a buy or sell side of the at least one order.

12. The exchange order fulfillment method of claim 1, wherein the at least one order is not open for public inspection unless the at least one order is consummated with a contra-side interest.

13. The exchange order fulfillment method of claim 1, further comprising allowing a retail order to interact with orders other than the at least one order.

14. The exchange order fulfillment method of claim 1, further comprising inhibiting a retail order from interacting with orders other than the at least one order.

15. An exchange order fulfillment system comprising: at least one processor of an electronic exchange to:

receive a plurality of electronic communications from participant computing devices via a communication network, each of the participant computing devices in communication with a particular port provided by the electronic exchange, the communications comprising orders for trades of one or more financial instruments in a message format comprising one or more tags and associated with one of Financial Information Exchange (FIX) protocol and Binary Order Entry (BOE) protocol, at least one of the orders comprising a plurality of tags identifying a financial instrument for a trade, an order side, and an amount of price improvement to be applied to one of a protected national best bid (NBB) or a protected national best offer (NBO) of the financial instrument for the trade;

fulfill the at least one order when the amount of the price improvement is more aggressive than a specified value of aggressiveness relative to the one of the protected NBB or the protected NBO of the financial instrument; and report information associated with fulfillment of the at least one order to at least one of the participant computing devices using the particular port in the message format or to a consolidated data stream at a particular interval of time for display on a user interface of the one of the participant computing devices.

16. The exchange order fulfillment system of claim 15, wherein the at least one order comprises a buy order having an interest value that is greater than the protected NBO.

17. The exchange order fulfillment system of claim 15, wherein the at least one order comprises a sell order having an interest value that is less than the protected NBB.

18. The exchange order fulfillment system of claim 15, the at least one processor further to receive a plurality of the orders from at least one participant computing device for a participant classified in at least two participant trading levels.

19. The exchange order fulfillment system of claim 18, wherein the at least one processor further to reject the at least one order when the amount of price improvement of the at least one order is less aggressive than the specified value of aggressiveness of the one of the protected NBB or the protected NBO, the specified value of aggressiveness for each of the at least two participant trading levels being different from one another.

20. The exchange order fulfillment system of claim 19, wherein the participant trading levels comprise a member trading level and a non-member trading level.

21. The exchange order fulfillment system of claim 20, wherein the member trading level has a first amount of price improvement that is less than a second amount of price improvement of the non-member trading level.

22. The exchange order fulfillment system of claim 19, the at least one processor further to accept orders from participant computing devices for participants classified at a specified participant trading level.

23. The exchange order fulfillment system of claim 15, wherein the at least one processor rejects the at least one order when the amount of price improvement of the at least one order is less aggressive than the specified value of aggressiveness of the one of the protected NBB or the protected NBO.

24. The exchange order fulfillment system of claim 15, the at least one processor further to charge a participant a fee for placing a price improvement order against a non-price improvement order, and provide a monetary credit for placing the non-price improvement order against the price improvement order.

25. The exchange order fulfillment system of claim 15, wherein the at least one processor further to publish a liquidity identifier identifying a symbol and a buy side or sell side of the at least one order.

26. The exchange order fulfillment system of claim 15, wherein the at least one processor determines whether to allow or inhibit a retail order from interacting with orders other than the at least one order according to a type of the retail order.

27. A non-transitory computer-readable medium having instructions stored thereon that, when executed by at least one processor of an electronic exchange, cause the at least one processor to perform operations comprising:
   receiving a plurality of electronic communications from participant computing devices via a communication network, each of the participant computing devices in communication with a particular port provided by the electronic exchange, the communications comprising orders for trades of one or more financial instruments in a message format comprising one or more tags and associated with one of Financial Information Exchange (FIX) protocol and Binary Order Entry (BOE) protocol, at least one of the orders comprising a plurality of tags identifying a financial instrument for a trade, an order side, and an amount of price improvement to be applied to one of a protected national best bid (NBB) or a protected national best offer (NBO) of the financial instrument for the trade;
   fulfilling the at least one order when the amount of the price improvement is more aggressive than a specified value of aggressiveness relative to the one of the protected NBB or the protected NBO of the financial instrument; and
   reporting information associated with fulfillment of the at least one order to the one of at least one participant computing device in the message format using the particular port or to a consolidated data stream at a particular interval of time for display on a user interface of the one of the participant computing devices.

28. The non-transitory computer-readable medium of claim 27, the operations further comprising receiving a plurality of the orders from at least one participant computing device for at least one participant classified in at least two participant trading levels.

29. The non-transitory computer-readable medium of claim 27, the operations further comprising rejecting the at least one order when the amount of price improvement of the at least one order is less aggressive than the specified value of aggressiveness of the one of the protected NBB or the protected NBO, the specified value of aggressiveness for each of the at least two participant trading levels being different from one another.

30. The non-transitory computer-readable medium of claim 29, wherein the participant trading levels comprise a member trading level and a non-member trading level.

31. The non-transitory computer-readable medium of claim 30, wherein the member trading level has a first amount of price improvement that is less than a second amount of price improvement of the non-member trading level.

32. The non-transitory computer-readable medium of claim 27, the operations further comprising rejecting the at least one order when the amount of price improvement of the at least one order is less aggressive than the specified value of aggressiveness of the one of the protected NBB or the protected NBO.

33. The exchange order fulfillment method of claim 1, further comprising:
   determining, by the at least one processor, values assigned to the plurality of tags of the at least one order; and
   based on the values of the plurality of tags, fulfilling the at least one order when the amount of the price improvement is more aggressive than the specified value of aggressiveness relative to the one of the protected NBB or the protected NBO of the financial instrument.

34. The exchange order fulfillment method of claim 1, wherein the at least one order comprises a tag identifying the at least one order as a price improvement order type.

35. The exchange order fulfillment method of claim 1, wherein the at least one order identifies a ceiling price above which the trade should not be executed or a floor price below which the trade should not be executed, and the method comprises fulfilling the at least one order when the amount of the price improvement is more aggressive than the specified value of aggressiveness relative to the one of the protected NBB or the protected NBO of the financial instrument, subject to the ceiling price or the floor price.

36. The exchange order fulfillment method of claim 1, wherein the price improvement value comprises at least $0.001 greater than the protected NBB or protected NBO for buy orders or at least $0.001 less than the protected NBB or protected NBO for sell orders.

37. The exchange order fulfillment system of claim 15, wherein the at least one processor:
   determines values assigned to the plurality of tags of the at least one order; and
   based on the values of the plurality of tags, fulfills the at least one order when the amount of the price improvement is more aggressive than the specified value of aggressiveness relative to the one of the protected NBB or the protected NBO of the financial instrument.

38. The exchange order fulfillment system of claim 15, wherein the at least one order comprises a tag identifying the at least one order as a price improvement order type.

39. The exchange order fulfillment system of claim 15, wherein the at least one order identifies a ceiling price above which the trade should not be executed or a floor price below which the trade should not be executed, and the at least one processor fulfills the at least one order when the amount of the price improvement is more aggressive than the specified value of aggressiveness relative to the one of the protected NBB or the protected NBO of the financial instrument, subject to the ceiling price or the floor price.

40. The exchange order fulfillment system of claim 15, wherein the price improvement value comprises at least $0.001 greater than the protected NBB or protected NBO for buy orders or at least $0.001 less than the protected NBB or protected NBO for sell orders.

* * * * *